UNITED STATES PATENT OFFICE 2,585,388

PREPARATION OF 2-MERCAPTOIMIDAZOLES

Reuben G. Jones, Indianapolis, Ind., assignor to Eli Lilly and Company, Indianapolis, Ind., a corporation of Indiana No Drawing. Application November 17, 1948, Serial No. 60,631

4 Claims. (Cl. 260—309)

My invention relates to organic chemical processes, and more particularly to a process of preparing 2-mercaptoimidazoles.

It is an object of my invention to provide a simple method of preparing imidazoles which have at least a mercapto substituent in the 2-position, such as 2-mercaptoimidazole and substitution products of 2-mercaptoimidazole in which substituents may be present in either or both of the 1 and 4 positions of the imidazole nucleus. Other objects will be apparent from the following disclosure.

In pursuance of the above and other objects, I have provided a process for preparing 2-mercaptoimidazoles by heat-decarboxylation of 2-mercapto-5-carboxyimidazoles.

It will be apparent that decarboxylation of 2-mercapto-5-carboxyimidazole will lead to the production of 2-mercaptoimidazole, and that decarboxylation of 2-mercapto-5-carboximidazoles containing substituents in positions 1 and 4 of the imidazole nucleus will give rise to correspondingly substituted 2-mercaptoimidazoles. For the purpose of clarity, a generic formula of 2-mercapto-5-carboxyimidazole is given below

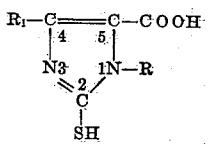

in which R and R₁ represent substituents attached respectively to the 1 and 4 positions of the imidazole nucleus.

Broadly stated, my process comprises heating a 2-mercapto-5-carboxyimidazole to a temperature above the melting point of the imidazolecarboxylic acid, whereupon decarboxylation occurs, as is evidenced by the liberation of carbon dioxide from the molten imidazole compound. Surprisingly, the mercapto compound group which is attached to the 2-position of the imidazole group is unaffected by the relatively high temperature required for the decarboxylation, e. g. from about 230° to 270° C.

A preferred manner of carrying out my process is as follows: The 2-mercapto-5-carboxyimidazole which is to be decarboxylated is placed in a suitable container, and while nitrogen is passed into the container, heat is applied to the container and its contents until the imidazole compound melts and a brisk evolution of carbon dioxide occurs. Heating is continued until the evolution of carbon dioxide ceases. The contents of the container are then cooled and are purified by recrystallization.

It is desirable that during the heating process the material subjected to decarboxylation be protected from atmospheric oxygen in order to avoid extensive decomposition of the decarboxylated imidazole. To avoid exposure to oxygen, the reaction preferably is carried out under an inert gas, for example, nitrogen or carbon dioxide. However, sufficient protection is generally afforded if a container having a relatively small neck orifice is employed. In this case, the carbon dioxide liberated during the reaction serves to insulate the reaction mixture from atmospheric oxygen.

The imidazole which is obtained by decarboxylation may be purified in any convenient manner, for example, by crystallization from a suitable solvent.

My invention is further illustrated by the following examples.

*Example 1.—Preparation of 1-phenyl-2-mercaptoimidazole*

1-phenyl-2-mercaptoimidazole represented by the following formula

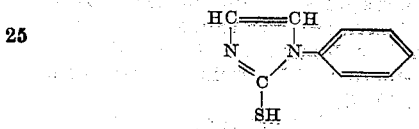

is prepared as follows: In a small glass flask are placed 11 g. (0.05 mol) of 1-phenyl-2-mercapto-5-imidazolecarboxylic acid. A slow stream of nitrogen gas is passed into the flask and the flask is heated to about 230° C., at which temperature the contents melt and carbon dioxide is evolved. The temperature is maintained at about 230° C. until evolution of carbon dioxide has substantially ceased. The contents of the flask, comprising 1-phenyl-2-mercaptoimidazole, are allowed to cool, whereupon the material crystallizes. The crystalline product is dissolved in 150 ml. of hot acetone. The resulting solution is treated with a small amount of decolorizing carbon and filtered. The filtrate is evaporated by heat until solid 1-phenyl-2-mercaptoimidazole appears in the solution, and 100 ml. of low-boiling petroleum ether are added and the mixture is cooled and allowed to stand until crystallization is complete. The crystalline 1-phenyl-2-mercaptoimidazole is filtered off and dried.

8.5 g. of 1-phenyl-2-mercaptoimidazole melting at about 180–181° C. are obtained. This represents a yield of about 97 percent of the amount theoretically possible.

The 1-phenyl-2-mercapto-5-imidazolecarboxylic acid used in this example can be prepared as follows: 62 g. of N-formyl-N-phenylglycine ethyl ester and 61 g. of ethyl formate are mixed and the mixture is cooled in an ice bath. To the cooled mixture are added with stirring over a period of about one hour, 22 g. of sodium methoxide suspended in about 70 ml. of dry benzene. The mixture is then allowed to stand in the refrigerator for several hours. The mixture is extracted with 150 ml. of water whereby an aqueous solution of the sodium enolate salt of N-formyl-N-phenyl-C-formylglycine ethyl ester is obtained. To the aqueous extract are added 62 ml. of 12 N hydrochloric acid and the solution is treated with 40 g. of sodium thiocyanate. During the addition of the hydrochloric acid and sodium thiocyanate the reaction mixture is kept cool. The reaction mixture is then heated to about 90° C for 1 hour, whereupon 1-phenyl-2-mercapto-5-carbethoxyimidazole, which is formed in the reaction, crystallizes. The mixture is cooled and filtered. 62 g. of 1-phenyl-2-mercapto-5-carbethoxyimidazole are obtained.

30 g. of 1-phenyl-2-mercapto-5-carbethoxyimidazole are suspended in 150 ml. of 1.7 N sodium hydroxide solution and the mixture is warmed to about 80° C. for 2 hours, whereupon the ester is hydrolyzed. The solution is acidified with hydrochloric acid and the 1-phenyl-2-mercapto-5-imidazolecarboxylic acid precipitates. The acid is washed with a small amount of cold water and dried. 26 g. of 1-phenyl-2-mercapto-5-imidazolecarboxylic acid are obtained.

Example 2

1-cyclohexyl-2-mercaptoimidazole represented by the following formula

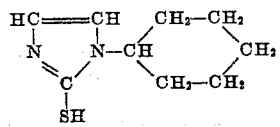

is prepared as follows: 11.4 g. (0.05 mol) of 1-cyclohexyl-2-mercapto-5-imidazolecarboxylic acid are decarboxylated according to the procedure described in Example 1, by heating the 1-cyclohexyl-2-mercapto-5-imidazolecarboxylic acid to about 240° C.

8.1 g. of 1-cyclohexyl-2-mercaptoimidazole are obtained. It melts at about 173-174° C. after recrystallization from acetone-petroleum ether mixture.

Example 3.—Preparation of 2-mercaptoimidazole 2-mercaptoimidazole represented by the following formula

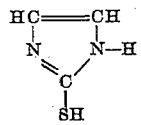

is prepared as follows: 15 g. of 2-mercapto-5-carboxyimidazole are heated above its melting point in a flask with a small neck until evolution of carbon dioxide has ceased. The 2-mercaptoimidazole remaining in the flask is purified according to the procedure of Example 1. 2-mercaptoimidazole melts at about 218-220° C.

Example 4.—Preparation of 1-methyl-2-mercaptoimidazole 1-methyl-2-mercaptoimidazole represented by the formula

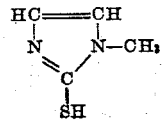

is prepared from 1-methyl-5-carboxy-2-mercaptoimidazole by the procedure described in Example 1. 1-methyl-2-mercaptoimidazole melts at about 148-150° C.

The 1-methyl-2-mercapto-5-carboxylic acid is obtained by alkaline hydrolysis of its methyl ester which can be prepared from N-formyl-N-methylglycine methyl ester according to the procedure described in Example 1.

Example 5

Additional examples of 2-mercaptoimidazoles which are prepared by my process are tabulated below. The decarboxylation process is carried out according to the procedure described in Example 1. The carboxylic acids which serve as starting material may be obtained by alkaline hydrolysis, as described in Example 1 of the corresponding carboxylic acid esters. The esters may be prepared by methods known to the art or by the process described in my copending application Serial No. 49,863, filed October 17, 1948, now U. S. Patent No. 2,541,924.

| Compound | Melting point, ° C. |
| --- | --- |
| 1-ethyl-2-mercaptoimidazole | 68-70 |
| 1-propyl-2-mercaptoimidazole | 115-116 |
| 1-n-butyl-2-mercaptoimidazole | 80-81 |
| 1-isobutyl-2-mercaptoimidazole | 137-138 |
| 1-tertiary-butyl-2-mercaptoimidazole | 189-190 |
| 1-secondary-heptyl-2-mercaptoimidazole | 72-73 |
| 1-allyl-2-mercaptoimidazole | 73-74 |
| 1-benzyl-2-mercaptoimidazole | 145-146 |
| 1-phenethyl-2-mercaptoimidazole | 166-167 |
| 1-ethyl-4-methyl-2-mercaptoimidazole | 208-210 |
| 4-ethyl-2-mercaptoimidazole | 165-167 |
| 4-propyl-2-mercaptoimidazole | 183-184 |
| 4-hexyl-2-mercaptoimidazole | 115-116 |
| 4-cyclopentyl-2-mercaptoimidazole | 218-221 |
| 4-benzyl-2-mercaptoimidazole | 223-224 |

I claim:

1. The method of preparing 2-mercaptoimidazoles which comprises heating a 2-mercapto-5-carboxyimidazole between the temperature of its melting point and a temperature of about 270° C. to produce decarboxylation of the 2-mercapto-5-carboxyimidazole, and recovering the imidazole compound which is produced.

2. The method of preparing 2-mercaptoimidazoles which comprises heating a 2-mercapto-5-carboxyimidazole to a temperature between about 230° C. and 270° C. until evolution of carbon dioxide has substantially ceased, and recovering the imidazole compound which is produced.

3. The method of preparing 1-methyl-2-mercaptoimidazole which comprises heating 1-methyl-2-mercapto-5-carboxyimidazole to a temperature between 230° C. and 270° C. until evolution of carbon dioxide has substantially ceased, and recovering the 1-methyl-2-mercaptoimidazole which is produced.

4. The method of preparing 1-phenyl-2-mercaptoimidazole which comprises heating 1-phenyl-2-mercapto-5-carboxyimidazole to a temperature between 230° C. and 270° C. until evolution of carbon dioxide has substantially ceased; and recovering the 1-phenyl-2-mercaptoimidazole which is produced.

REUBEN G. JONES.

REFERENCES CITED

The following references are of record in the file of this patent:

Beilstein, 4th ed. (1936), vol. 25, p. 216.